United States Patent
Xu et al.

(10) Patent No.: US 9,445,336 B2
(45) Date of Patent: Sep. 13, 2016

(54) METHOD AND DEVICE FOR SUPPORTING GROUP HANDOVER

(71) Applicant: Samsung Electronics Co., Ltd., Gyeonggi-do (KR)

(72) Inventors: Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 14/356,351

(22) PCT Filed: Nov. 1, 2012

(86) PCT No.: PCT/KR2012/009120
§ 371 (c)(1),
(2) Date: May 5, 2014

(87) PCT Pub. No.: WO2013/066071
PCT Pub. Date: May 10, 2013

(65) Prior Publication Data
US 2014/0286314 A1    Sep. 25, 2014

(30) Foreign Application Priority Data

Nov. 4, 2011 (CN) ........................... 2011 1 0346608
Jun. 27, 2012 (CN) ........................... 2012 1 0217694

(51) Int. Cl.
*H04B 7/14* (2006.01)
*H04W 36/28* (2009.01)
(Continued)

(52) U.S. Cl.
CPC ......... *H04W 36/28* (2013.01); *H04W 36/0055* (2013.01); *H04W 8/186* (2013.01); *H04W 92/20* (2013.01)

(58) Field of Classification Search
CPC . H04W 36/28; H04W 36/055; H04W 8/186; H04W 92/20
See application file for complete search history.

(56) References Cited

U.S. PATENT DOCUMENTS

| 2010/0039981 A1* | 2/2010 | Lee ........................ H04B 7/155 370/315 |
| 2011/0021199 A1* | 1/2011 | Hapsari ................... H04W 4/20 455/440 |

(Continued)

FOREIGN PATENT DOCUMENTS

KR    10-2009-0044074    5/2009

OTHER PUBLICATIONS

International Search Report dated Mar. 22, 2013 in connection with International Patent Application No. PCT/KR2012/009120, 3 pages.

(Continued)

*Primary Examiner* — Robert Wilson

(57) ABSTRACT

The method and the device for supporting group handover are disclosed. The method supporting group handover is provided, which is applied to UE in communication with network via a RN, including: a base station S-DeNB switching RN to a base station T-DeNB; and said S-DeNB switching UE served by said RN to said T-DeNB; wherein the MME serving said RN and the MME serving UE served by said RN are the same. Another embodiment of the present invention further provides a base station supporting group handover, The technical scheme set forth in the present invention can reduce unnecessary signaling procedure, the possibility of network congestion, and can reduce the signaling procedure of handover when group handover occurs, so as to reduce the failure of the handover process and ensure the continuity of service.

26 Claims, 10 Drawing Sheets

(51) Int. Cl.
  *H04W 36/00* (2009.01)
  *H04W 8/18* (2009.01)
  *H04W 92/20* (2009.01)

(56) References Cited

U.S. PATENT DOCUMENTS

| | | | | |
|---|---|---|---|---|
| 2011/0098048 A1* | 4/2011 | Zhang | .................. | H04W 64/00 |
| | | | | 455/438 |
| 2011/0208842 A1* | 8/2011 | Mildh | .................... | H04B 7/155 |
| | | | | 709/220 |
| 2012/0039468 A1* | 2/2012 | Ishida | .................. | H04W 12/04 |
| | | | | 380/247 |
| 2012/0051349 A1* | 3/2012 | Teyeb | .................. | H04W 36/02 |
| | | | | 370/338 |
| 2013/0163504 A1* | 6/2013 | Jia | ......................... | H04W 60/00 |
| | | | | 370/315 |
| 2014/0194127 A1* | 7/2014 | Wang | ................ | H04W 36/0055 |
| | | | | 455/438 |
| 2014/0206354 A1* | 7/2014 | Yasuoka | .................. | H04B 7/15 |
| | | | | 455/436 |

OTHER PUBLICATIONS

Written Opinion of International Searching Authority dated Mar. 22, 2013 in connection with International Patent Application No. PCT/KR2012/009120, 5 pages.

* cited by examiner

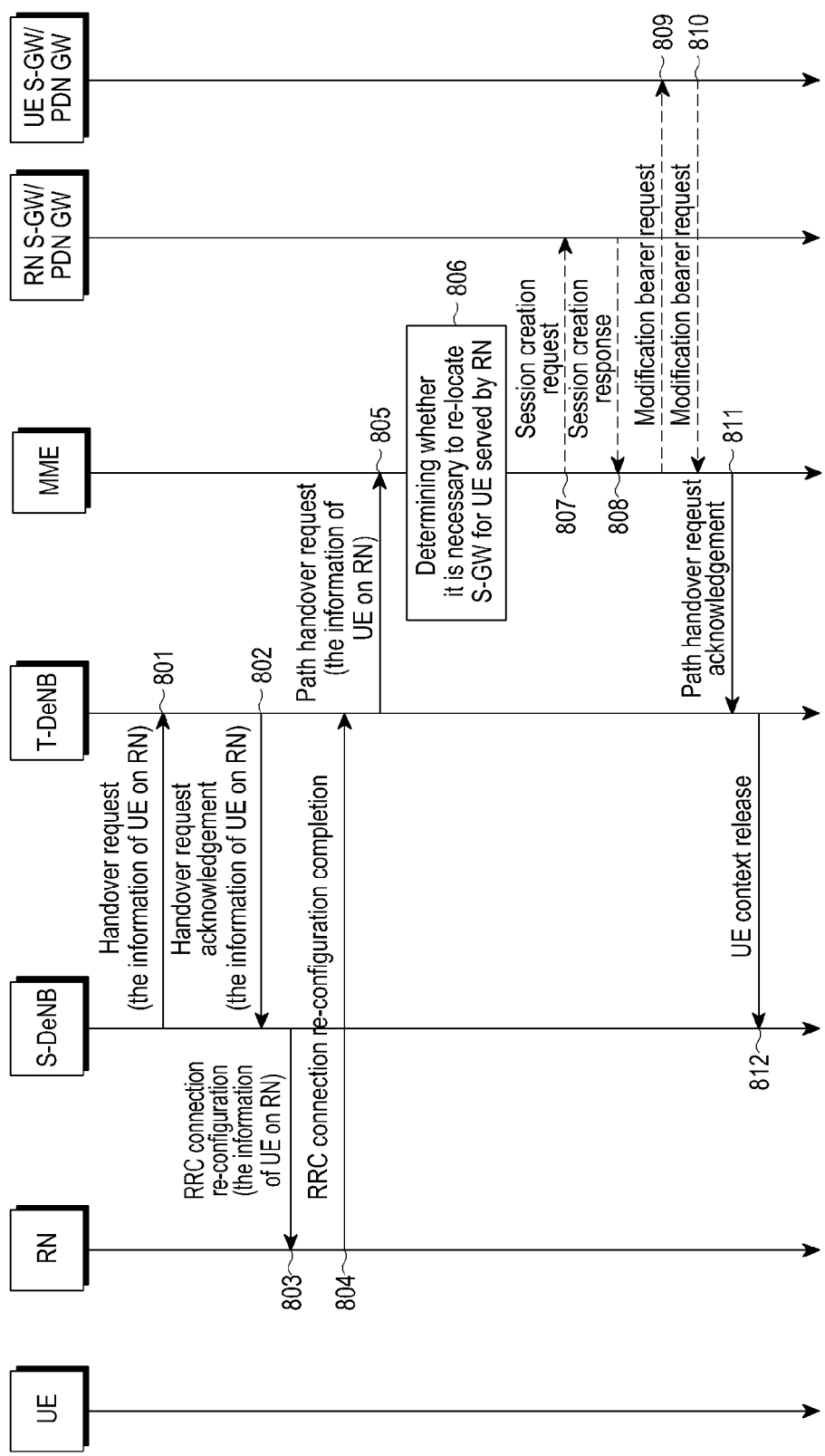

METHOD AND DEVICE FOR SUPPORTING GROUP HANDOVER

CROSS-REFERENCE TO RELATED APPLICATION(S)

The present application claims priority under 35 U.S.C. §365 to International Patent Application No. PCT/KR2012/009120 filed Nov. 1, 2012, entitled "METHOD AND DEVICE FOR SUPPORTING GROUP HANDOVER". International Patent Application No. PCT/KR2012/009120 claims priority under 35 U.S.C. §365 and/or 35 U.S.C. §119(a) to Chinese Patent Application No. 201110346608.6 filed Nov. 4, 2011 and Chinese Patent Application No. 201210217694.5 filed Jun. 27, 2012 and which are incorporated herein by reference into the present disclosure as if fully set forth herein.

TECHNICAL FIELD

The present invention relates to mobile communications system field and, in particular, to a method and device for supporting group handover.

BACKGROUND ART

The existing handover process that each User Equipment (UE) needs interaction of dozens of messages to perform each handover process. X2 handover process via macro base stations (that is enhanced Node Bs: eNBs) is more optimal than S1 handover via a management Entity (MME) and a Serving Gateway (S-GW) of a core network, whereas Relay Node (RN) and UE both are moving on the train advancing at a high speed, and if multiple UEs simultaneously perform handover process, it will lead to unnecessary resource waste for network and will easily lead to failure of handover process. In order to solve the problem of low handover success rate and improve the efficiency of handover, the concept of group mobility is set forth, but there is no specific solution about how group mobility does now.

If RN and UEs served by the RN simultaneously perform handover process, how to ensure coordinated work is also a problem that cannot be ignored.

In addition, there are two other problems:

Problem one: When RN moves from one another macro base station (that is Donor eNB: DeNB) to another DeNB (target DeNB), MME to which the target DeNB connects may be different from the MME to which the source DeNB connects. So the problem is how to select MME serving the UE, how to transmit context information of UE, and how to establish user plane transmitting path at network side for UE.

Problem two: how to let UE know the change of information at network side, e.g. change of Global Unique Temporary Identifier (GUMMEI) of new serving MME, and generally GUMMEI is included in the Global UE Temporary identifier (GUTI) that MME allocates to UE.

Therefore, it is necessary to provide an effective technical solution to solve group movement and group handover.

DISCLOSURE OF INVENTION

Technical Problem

In view of this, the present invention provides a technical solution for supporting UE group handover, which can ensure that UE continuously receives data in the environment of high-speed movement, reduce unnecessary signaling procedure, and reduce possibility of network congestion.

Solution to Problem

In order to achieve the above object, one embodiment of the present invention provides a method of supporting group handover, which is applied to UE in communications with network via relay nodes (RN), including: a base station S(Serving or Source)-DeNB switching RN to a base station T(Target)-DeNB, and the S-DeNB switching the UE served by RN to the T-DeNB; wherein the MME serving the RN and the MME serving the UE served by the RN are the same.

Another embodiment of the present invention also provides a base station supporting group handover, including a receiving module for receiving the information forwarded by UE via a relay node (RN) and a transmitting module for sending information to another base station T-DeNB to achieve handover of the RN to the T-DeNB and handover of the UE served by the RN to the T-DeNB, wherein the MME serving the RN and the MME serving the UE served by the RN are the same.

The method or device set forth in the present invention is applicable to the architecture where the S-GW and PDN GW of RN are collocated at RN or to the architecture where the S-GW and PDN GW of RN are single entities (S-GW/PDN GW is non-collocated with RN at the same entity). In addition, in the method or device set forth in the present invention, the S-GW of RN and the S-GW of UE served by RN may be different. The cell of RN has a unique 28 bit cell identifier along the high-speed railway, and RN supports PLMN along the railway. The cell identifier of RN may not include identifier of DeNB. The method or device set forth in the present invention can reduce unnecessary signaling procedure, the possibility of network congestion, and the signaling procedure of handover, so as to reduce the failure of the handover process and ensure the continuity of service.

The additional aspects and advantages of the present invention will be partly provided and will become obvious from the following depictions, or will be known by the practice of the present invention.

BRIEF DESCRIPTION OF DRAWINGS

The above and/or additional aspects and advantages of the present invention will be obvious and easy to understand from the following depictions of embodiments in combination with the accompanying drawings, wherein:

FIG. 8 is a work flow chart of the application scene six of supporting group handover in the present invention;

MODE FOR THE INVENTION

Figure 1:
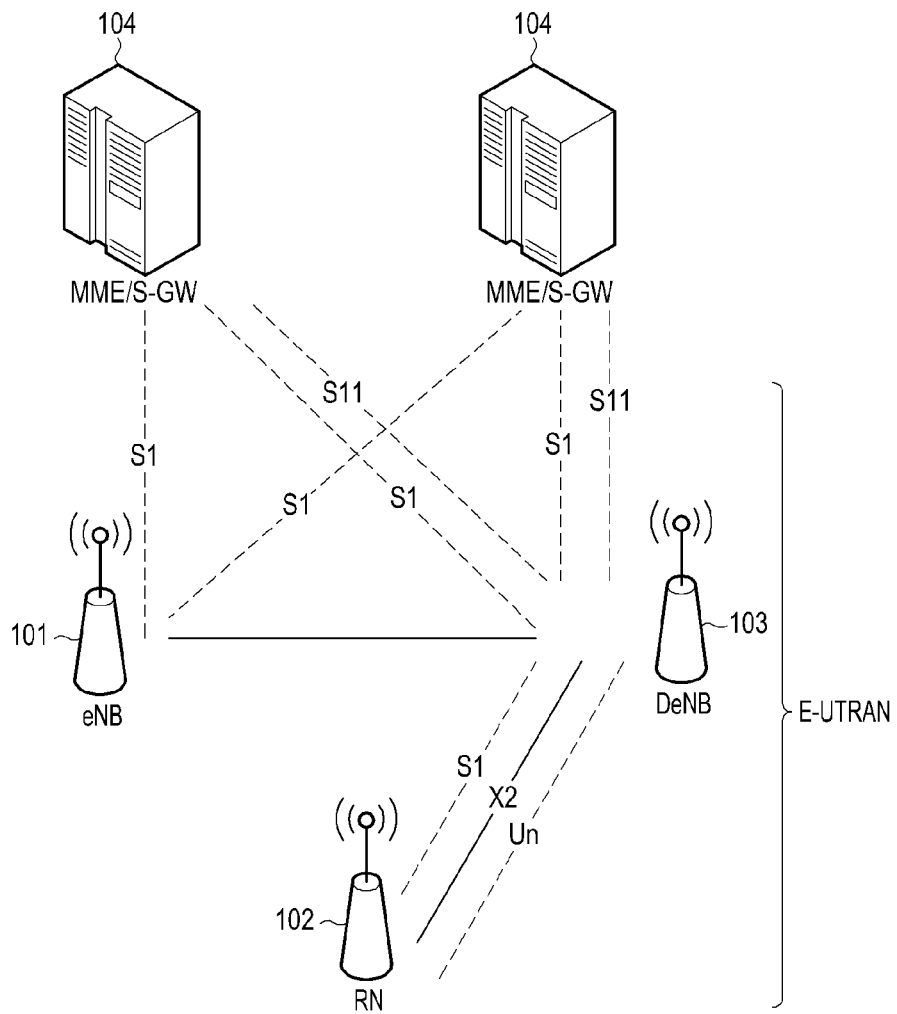
FIG. 1 is a schematic diagram of the structure of the LTE system supporting relay nodes (RN)

The embodiments of the present invention are specifically described below, and are illustrated in the drawings, wherein the same or similar reference signs always represent same or similar components or components having the same or similar functions. The following embodiments with reference to the accompanying drawings are exemplary and are only used to explain the present invention, but cannot be explained as limiting the present invention.

FIG. 1 is a schematic diagram of the structure of the LTE (Long-Term Evolution) system supporting relay nodes (RN).

As illustrated in FIG. 1, it is a schematic diagram of the structure of the existing LTE supporting relay nodes (RN). In a wireless access network of the LTE system, a wireless resource management entity includes a macro base station (eNB) 101 and a RN 102, and RN accesses a core network via another macro base station (DeNB) 103. DeNB is a base station for RN access and is called Donor eNB, wherein eNBs 101 are connected to each other via X2 interface, and each eNB 101 is respectively connected to the Mobility Management Entity (MME) and the Serving Gateway (S-GW) 104 of the core network via S1 interface; and RN 102 accesses DeNB 103 via Un interface. DeNB 103 provides X2 proxy function between RN 102 and other eNB. DeNB 103 provides S1 proxy function between RN 102 and MME/S-GW 104. The proxy functions of S1 and X2 include transmitting UE dedicated X2 and S1 signalings between RN 102 and eNB 101, RN 102 and MME 104, and transmission between RN 102 and S-GW 104.

The existing relay is used for fixed location and does not support motion between different cells. The problem now faced by operators is on the train moving at a high speed, e.g. the serve quality provided by the existing relay cannot satisfy the operator's demands on the train at a speed of 250-350 kilometers, such as high noise, high penetration damage, serious Doppler frequency deviation, and lower handover success rate. Thus the operator proposed a study subject of mobile relay. The mobile relay is to solve the above problems in the exiting relay, improving the quality of the service that can be provided in the high-speed trains and better satisfying users' demands.

There are two kinds of handover processes in the exiting LTE, i.e. S1 handover and X2 handover.

Figure 2:
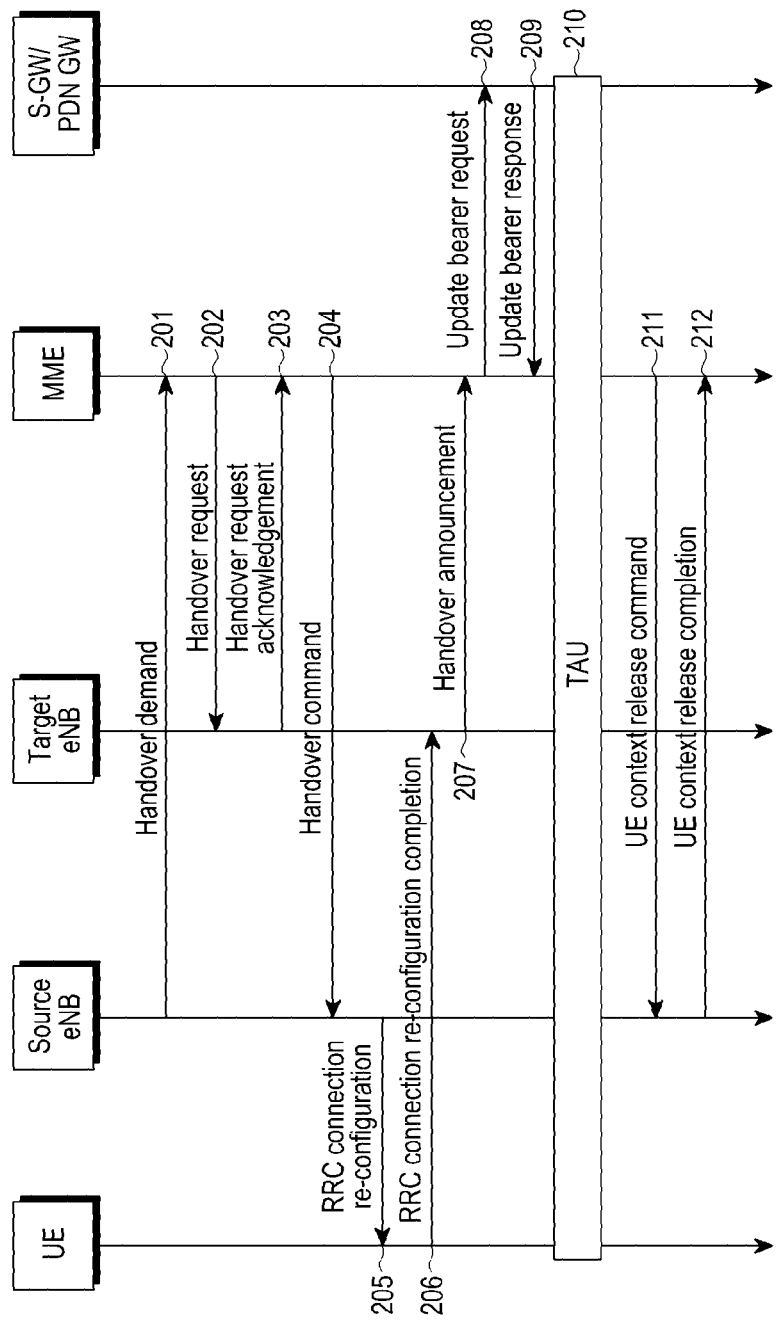
FIG. 2 is a flow chart of the existing S1 handover.

FIG. 2 described the handover process of the exiting UE, taking S1 handover as an example. As illustrated in FIG. 2, the following steps are included:

Step 201: source eNB sends a handover required message to the MME.

How UE sends a measurement report to source eNB and how eNB initiates a handover may refer to the existing communications protocol.

Step 202: MME sends a handover request message to a target eNB.

The source base station S-DeNB refers to eNB where UE is initially located, and the target base station T-DeNB refers to eNB where UE will be switched to.

Step 203: the target eNB allocates resource for UE and sends a handover request acknowledgement message to MME.

Step 204: MME sends a handover command message to the source eNB.

Step 205: source eNB sends a RRC connection re-configuration message to UE.

Step 206: UE is synchronized to the target cell and sends a RRC connection re-configuration completion message to the target eNB.

Step 207: the target eNB sends a handover notify message to MME.

Step 208: MME sends an update bearer request message to Serving Gateway/Packet Data Network Gateway (S-GW/PDN GW).

S-GW is mainly used to provide user plane function; and PDN GW is mainly used to complete functions of billing and lawful interception. S-GW and PDN GW may physically be one entity or two. In this step, signaling interaction between S-GW and PDN GW is omitted.

Step 209: S-GW/PDN GW sends an update bearer response message to MME.

Step 210: UE initiates a Track Area Update (TAU) procedure.

Step 211: MME sends a UE context release command message to the source eNB.

Step 212: the source eNB sends a UE context release completion message to MME.

The embodiments of the present invention provide a method for supporting group handover on one hand, which is applied to UE in communication with network via the relay node (RN), including the following steps:

A base station S-DeNB switches RN to a base station T-DeNB, and the S-DeNB switches UE served by RN to T-DeNB, wherein the MME serving RN and the MME serving UE served by RN are the same.

Specifically speaking, in step S110, the base station obtains the information of UE accessing the network via RN through the type of the received message; or the base station obtains the information of UE accessing the network via RN based on the instruction of RN.

Specifically speaking, in step S110, S-DeNB switching RN to T-DeNB and S-DeNB switching UE served by RN to T-DeNB are performed simultaneously or respectively.

Specifically speaking, in step S110, S-DeNB switching RN to T-DeNB and S-DeNB switching UE served by RN to T-DeNB include the following steps:

S-DeNB sends UE identifier of UE served by RN in RN and S-DeNB interface to T-DeNB, e.g., S-DeNB sends the UE identifier of UE served by RN in RN and S-DeNB interface to T-DeNB through handover required and handover request messages;

T-DeNB allocates the user plane resource for the UE served by the RN in RN and T-DeNB interface and MME UE S1 AP ID in S1 interface between RN and T-DeNB for UE served by RN;

T-DeNB notifies S-DeNB of the resource allocated for UE by T-DeNB, e.g., T-DeNB notifies S-DeNB of the resource allocated for UE by T-DeNB through handover request acknowledgement and handover command messages;

S-DeNB sends a RRC connection re-configuration message to RN, the message including the resource information allocated by T-DeNB for UE served by RN;

RN sends a RRC connection re-configuration completion message to T-DeNB;

T-DeNB sends a handover notify message to MME;

MME updates bearers of RN and UE served by RN.

Specifically speaking, in step S110, S-DeNB switching RN to T-DeNB and S-DeNB switching UE served by RN to T-DeNB include the following steps:

S-DeNB sends a handover request message to T-DeNB, the message including the UE identifier of UE served by RN in RN and S-DeNB interface;

T-DeNB allocates the user plane resource for the UE served by the RN in RN and T-DeNB interface, and MME UE S1 AP ID in S1 interface between RN and T-DeNB for UE served by RN;

T-DeNB sends a handover request acknowledgement message to S-DeNB, the message including the resource allocated by T-DeNB for UE;

S-DeNB sends a RRC connection re-configuration message to RN, the message including the resource information allocated by T-DeNB for UE served by RN;

RN sends a RRC connection re-configuration completion message to T-DeNB;

T-DeNB sends a path switch request message to MME, the message including the information of UE served by RN;

MME updates bearers of RN and UE on the RN;

MME sends a path switch request acknowledgement message to T-DeNB, the message including the information of UE on the RN;

T-DeNB sends UE context release message to S-DeNB.

In the above method, the UE identifier of UE in RN and S-DeNB interface is eNB UE S1 AP ID and/or MME UE S1 AP ID.

In the above method, the user plane resource in RN and T-DeNB interface allocated by T-DeNB for UE served by RN includes E-RAB identifier, and downlink TEID and transport layer address of UE served by RN in RN and S-DeNB interface allocated by RN.

In the above method, the resource information allocated by T-DeNB for UE served by RN includes the user plane information in RN and T-DeNB interface allocated by T-DeNB for UE served by RN, and/or MME UE S1 AP ID in S1 interface between RN and T-DeNB.

In the above method, it further includes: MME may update the information of UE by sending messages to UE via the base station and RN.

The information for updating UE includes Global UE Temporary Identifier (GUTI), and/or Track Area Identifier (TAI) list.

Specifically speaking, in step S110, S-DeNB switching RN to T-DeNB and S-DeNB switching UE served by RN to T-DeNB include the following steps:

S-DeNB sends a handover required message to MME to initiate a handover preparation process for switching RN;

S-DeNB sends a handover required message to MME to initiate a handover preparation process for switching UE served by RN, the message including S1 control plane and user plane information of UE served by the RN between RN and S-DeNB; the control plane information includes eNB UE S1 AP ID and/or MME UE S1 AP ID of UE in RN and S-DeNB interface; the user plane information includes downlink TEID and transport layer address and/or uplink TEID and transport layer address of UE in RN and S-DeNB interface;

When the handover preparation for switching RN and switching UE under RN is completed, i.e. when S-DeNB receives the handover command message corresponding to switching RN and each UE served by RN, S-DeNB sends a RRC connection re-configuration message to RN, the message including the information of UE served by RN;

RN sends a RRC connection re-configuration completion message to T-DeNB;

T-DeNB sends a handover notify message to MME;

MME updates bearers of RN and UE on the RN.

In the above method, the information of UE served by RN that is included in the path switch request message includes:

eNB UE S1 AP ID of UE between T-DeNB and MME, MME UE S1 AP ID of UE between S-DeNB and MME;

E-RAB information of UE in downlink switch, including E-RAB identifier, downlink TEID and transport layer address of T-DeNB and MME interface allocated by T-DeNB;

the target PLMN selected for UE, including PLMN identifier or target PLMN identifier to be selected for UE that is included in the selected TAI.

In the above method, the information of UE served by RN that is included in the path switch request acknowledgement message includes:

eNB UE S1 AP ID and/or MME UE S1 AP ID of UE between T-DeNB and MME;

E-RAB information of uplink switch, E-RAB identifier, and uplink TEID and transport layer address between T-DeNB and MME;

E-RAB information required to be released.

Figure 10:
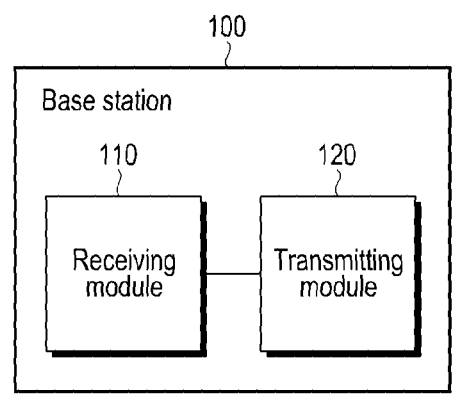
FIG. 10 is a schematic diagram of the structure of the base station in the embodiments of the present invention.

FIG. 10 is a schematic diagram of the structure of the base station in the embodiments of the present invention.

Corresponding to the above method, as illustrated in FIG. 10, at least one of the embodiments of the present invention on the other hand further provide a base station 100 supporting group handover, including a receiving module 110 and a transmitting module 120.

Specifically speaking, the receiving module 110 is used for receiving the information of UE forwarded through the relay node (RN).

The receiving module 110 obtains the information of UE accessing the network via RN according to the type of the received message; or the receiving module 110 obtains the information of UE accessing the network via RN according to the instruction of RN, wherein the MME serving RN and the MME serving UE served by RN are the same.

The transmitting module 120 is used for sending information to another base station T-DeNB to achieve switching RN to T-DeNB and switching UE served by RN to T-DeNB.

The transmitting module 120 switching RN to T-DeNB and the transmitting module 120 switching UE served by RN to T-DeNB are performed simultaneously or respectively.

Further, the transmitting module 120 switching RN to T-DeNB and the transmitting module 120 switching UE served by RN to T-DeNB include the following steps:

The transmitting module 120 sends the UE identifier of UE served by RN in the RN and source base station interface to T-DeNB, e.g., the transmitting module 120 sends the UE identifier of UE served by RN in the RN and source base station interface to T-DeNB through handover required and handover request messages;

T-DeNB allocates the user plane information of RN and T-DeNB interface and MME UE S1 AP ID of S1 interface between RN and T-DeNB for UE served by RN;

T-DeNB notifies the receiving module 110 of the resource allocated by T-DeNB for UE, e.g. T-DeNB notifies the receiving module 110 of the resource allocated by T-DeNB for UE through handover request acknowledgement and handover command messages;

The transmitting module 120 sends a RRC connection re-configuration message to RN, the message including the resource information allocated by T-DeNB for UE served by RN;

RN sends a RRC connection re-configuration completion message to T-DeNB;

T-DeNB sends a handover notify message to MME;

MME updates bearers of RN and UE served by RN.

Further, the transmitting module 120 switching RN to T-DeNB and the transmitting module 120 switching UE served by RN to T-DeNB include the following steps:

the transmitting module 120 sends a handover request message to T-DeNB, the message including UE identifier of UE served by RN in the RN and source base station interface;

T-DeNB allocates the user plane information of the RN and T-DeNB interface, and MME UE S1 AP ID of S1 interface between RN and T-DeNB for UE served by RN;

T-DeNB sends a handover request acknowledgement message to the receiving module 110, the message including notifying S-DeNB of the resource allocated by T-DeNB for UE;

the transmitting module 120 sends a RRC connection re-configuration message to RN, the message including the resource information allocated by T-DeNB for UE served by RN;

RN sends a RRC connection re-configuration completion message to T-DeNB;

T-DeNB sends a path switch request message to MME, the message including the information of UE served by RN;

MME updates bearers of RN and UE on RN;

MME sends a path switch request acknowledgement message to T-DeNB, the message including the information of UE on RN;

T-DeNB sends a UE context release message to the receiving module 110.

Further, the transmitting module 120 switching RN to T-DeNB and the transmitting module 120 switching UE served by RN to T-DeNB include the following steps:

the transmitting module 120 sends a handover required message to MME to initiate the handover preparation process for switching RN;

the transmitting module 120 sends a handover request message to MME to initiate the handover preparation process for switching UE served by RN, the message including S1 control plane and user plane information of UE under RN between RN and source base station; the control plane information includes eNB UE S1 AP ID and/or MME UE S1 AP ID of UE in the RN and source base station interface; the user plane information includes downlink TEID and transport layer address and/or uplink TEID and transport layer address of UE in the RN and source base station;

When the handover preparation for switching RN and UE under RN is completed, i.e. when the receiving module 110 receives a handover command message corresponding to switching RN and each UE served by RN, the transmitting module 120 sends a RRC connection re-configuration message to RN, the message including the information of UE served by RN;

RN sends a RRC connection re-configuration completion message to T-DeNB;

T-DeNB sends a handover notify message to MME;

MME updates bearers of RN and UE on RN.

The method or device set forth in the present invention is applicable to the architecture where the S-GW and PDN GW of RN are collocated at RN or to the architecture where the S-GW and PDN GW of RN are single entities (S-GW/PDN GW is non-collocated with RN at the same entity). In addition, in the method or device set forth in the present invention, the S-GW of RN and the S-GW of UE served by RN may be different. The cell of RN has a unique 28 bit cell identifier along the high-speed railway, and RN supports PLMN along the railway. The cell identifier of RN may not include identifier of DeNB. The method or device set forth in the present invention can reduce unnecessary signaling procedure, the possibility of network congestion, and the signaling procedure of handover, so as to reduce the failure of the handover process and ensure the continuity of service. In the method of the present invention, the cell of RN may have a unique 28 bit cell identifier along the high-speed railway, and RN supports PLMN along the railway. The cell identifier of RN may not include identifier of DeNB. The method of the present invention is not limited to this.

In order to further clarify the object, technical schemes and advantages of the present invention, the method and device set forth in the present invention are further expounded by examples with reference to the accompanying drawings as follows.

Application Scene One

Figure 3:
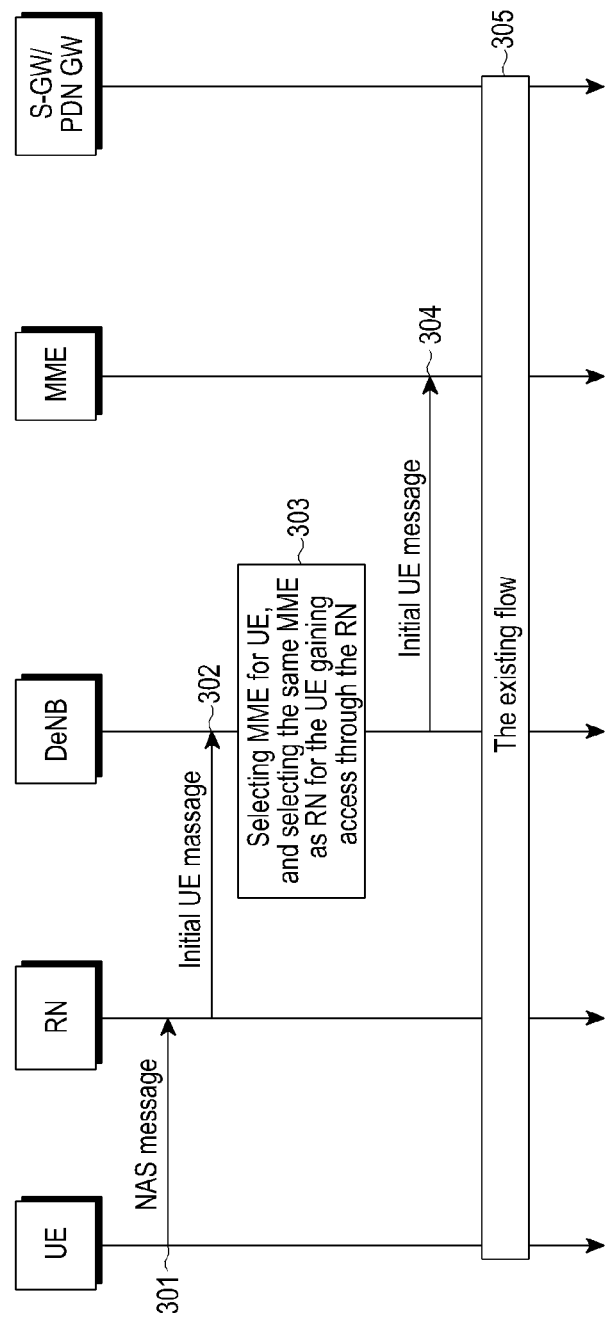
FIG. 3 is a work flow chart of the application scene one in which UE selects MME under RN in the present invention.

FIG. 3 is a work flow chart of the application scene one in which UE selects MME under RN in the present invention. As illustrated in FIG. 3, the procedure includes the following steps:

Step 301: UE sends a NAS message to RN, e.g. Attach message or TA update request message. In this step, UE may send uplink NAS message to RN through uplink information transmission or RRC connection establishment complete.

Step 302: RN sends an initial UE message to DeNB. The message includes the NAS message received from UE.

Step 303: DeNB selects serving MME for UE. DeNB is aware that UE accesses RN cell. DeNB may be aware of the information accessed by UE through RN by the following several ways:

Method 1: according to the initial UE message, DeNB may know that it is RN that is connected below, and now only RN may send the initial UE message to DeNB;

Method 2: according to the S1 establishment process, DeNB may know that it is RN that is connected below, and now only RN may send the S1 establishment request to DeNB, and there is a Un interface only between RN and DeNB;

Method 3: in the RN connection process, e.g. the RRC connection establishment process, RN may send RN instruction to DeNB, and DeNB knows that it is RN node below according to the RN instruction of a RRC layer;

Method 4: RN instruction is included in the initial UE message, and DeNB knows that UE accesses via RN according to this instruction. This method may let DeNB know that the information of UE accessing via RN in the condition that other types of nodes may also access the network via DeNB or may send S1 establishment request and the initial UE message to DeNB in the future, and this method does not need to depend on the information of other protocol layers and is more convenient in checking.

DeNB connected by RN knows that UE accesses the network via RN, and DeNB selects the same MME for UE served by the RN as the RN.

Step 304: DeNB sends the initial UE message to the selected MME.

Step 305: Other processes are the same as the processes prescribed in the existing protocol, and thus are not repeated here.

Now the whole working procedure for selecting MME for UE in the method of supporting group handover in the application scene one of the present invention is completed.

Application Scene Two

RN needs to switch from source DeNB, i.e. S-DeNB, to the target DeNB, i.e. T-DeNB, in the process of movement. This application scene provides the handover procedure of RN and UE, ensuring the continuity of the service of UE served by RN and reducing handover signaling. In this embodiment, the handover of UE served by RN and the handover of RN are performed simultaneously, referring to FIG. 4 for details.

Figure 4:
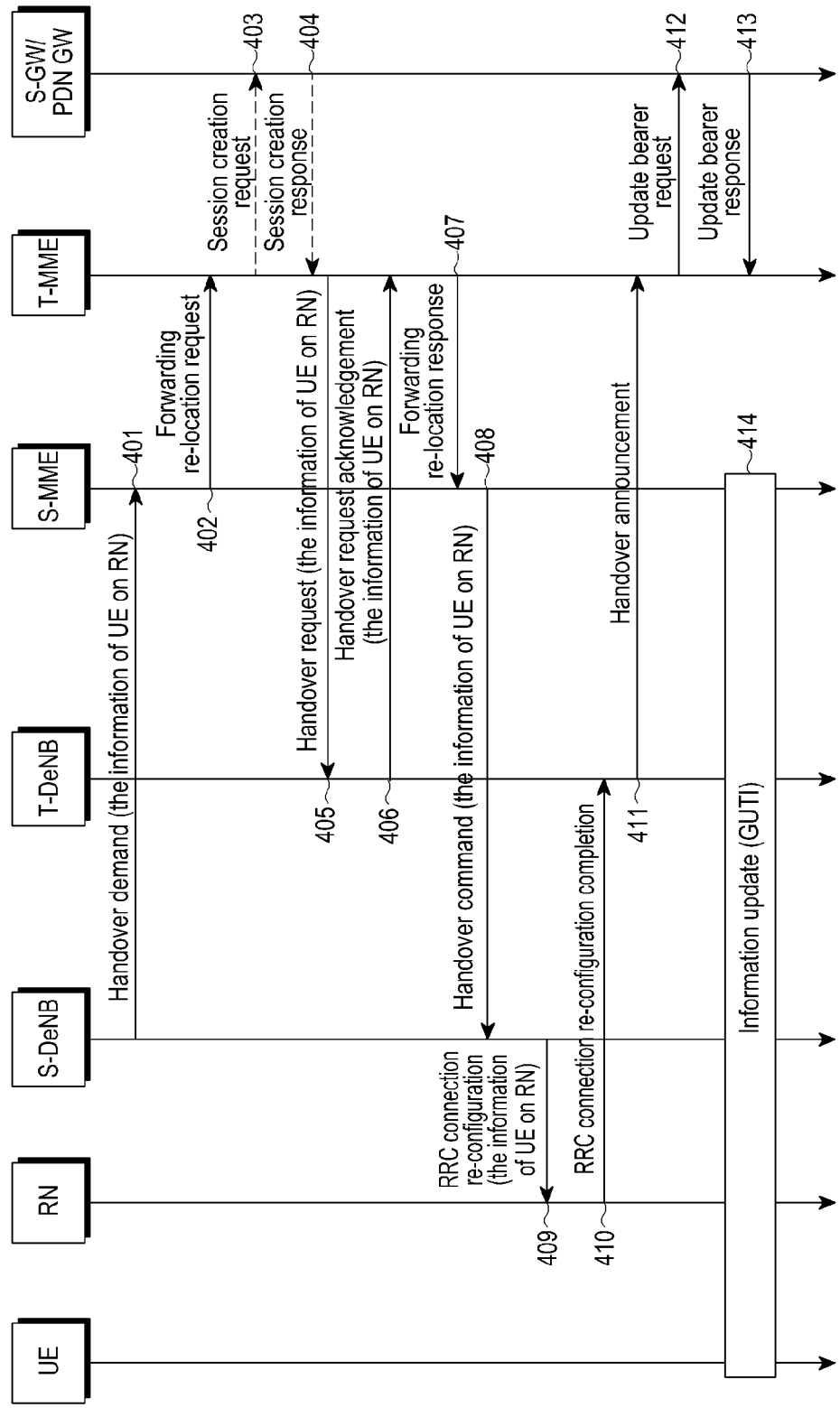
FIG. 4 is a work flow chart of the application scene two of supporting group handover in the present invention.

FIG. 4 is a work flow chart of the application scene two of supporting group handover in the present invention. As illustrated in FIG. 4, the detailed explanation for the steps unrelated to the present invention is omitted. This procedure includes the following steps:

Step 401: S-DeNB decides to initiate handover of RN. S-DeNB also switches the UE served by RN to T-DeNB at the same time. S-DeNB sends a handover required message to source MME, i.e. S-MME, that is, MME serving RN and UE under RN. The handover required message includes all existing information of RN as UE. The message also includes the information of UE served by RN. The information of the UE includes (may be one or more or all):

eNB UE S1 AP ID, and MME UE S1 AP ID of UE in S1 interface between RN and S-DeNB;
  eNB UE S1 AP ID, and MME UE S1 AP ID of UE in S1 interface between S-DeNB and S-MME. Alternatively, the UE information may also not include this part of information, since S-MME has already known this part of information;
  E-RAB information of UE, e.g. E-RAB identifier. It may also include downlink TEID and transport layer address of UE in the RN and S-DeNB interface allocated by RN.

S-DeNB selects Public Land Mobile Network (PLMN) for each UE according to Handover Restriction List (HRL) of UE served by RN, and the PLMN selected for UE is included in the UE information, which may be PLMN identifier, or target PLMN identifier selected for UE that is included in the selected TAI.

Step 402: S-MME selects target MME for RN and UE under RN, i.e. T-MME. S-MME may select the same target MME for RN and UE under RN. S-MME sends a forwarding re-location request message to T-MME. The message includes the information of UE served by RN that is received in step 401. The step of this process does not exist in the condition of no MME re-location.

Step 403: T-MME judges whether it is necessary to re-locate S-GW for each UE served by RN. If T-MME is required to select a new S-GW and send a session creation request message to the new S-GW, the specific signaling procedure between S-GW and PDN GW is omitted. S-MME judges whether it is necessary to re-locate S-GW for each UE in the condition that MME does not re-locate, if a new S-GW is required to be selected. If S-GW does not need re-allocation, the processes of this step and step 404 do not need to be performed.

The message includes bearing context information, comprising uplink PDN GW address and channel identifier TEID connected by each PDN. The target S-GW allocates uplink S-GW address and TEID of S1-U interface.

As to S-GW and PDN GW of RN being architecture of single entities (S-GW/PDN GW is non-collocated with RN at the same entity), T-MME judges whether it is necessary to modify S-GW serving RN. If yes, the same process hereinabove is performed.

Step 404: S-GW sends a session creation response message to T-MME. The message includes uplink S-GW address and TEID of S1-U interface allocated by S-GW.

Step 405: T-MME sends a handover request message to T-DeNB. The message includes the identifier information and bearer information of RN as UE. T-MME allocates MME UE S1 AP ID for each UE served by RN. The handover request message includes the information of UE served by RN. The UE information includes (may be one or more or all):

MME UE S1 AP ID allocated by T-MME for each UE served by RN;
  E-RAB information to be established by UE served by RN, including E-RAB identifier, uplink transport layer address and TEID allocated by T-S-GW, QoS information of E-RAB; and it may also include downlink TEID and transport layer address of UE served by RN that are allocated in the RN and S-DeNB interface.
  eNB UE S1 AP ID, and MME UE S1 AP ID of UE in S1 interface between RN and S-DeNB.

It needs to explain that this step is performed as step 401 and is not a necessary step in this method, and thus may be omitted.

Step 406: T-DeNB allocates wireless resource of a Un interface for RN. T-DeNB allocates eNB UE S1 AP ID of T-DeNB and T-MME interface for UE served by RN. T-DeNB allocates downlink TEID and transport layer address of T-DeNB and T-MME interface for UE served by RN. T-DeNB allocates uplink TEID and transport layer address of the RN and T-DeNB interface for UE served by RN. T-DeNB allocates MME UE S1 AP ID of the RN and T-DeNB for UE served by RN.

T-DeNB sends a handover request acknowledgement message to T-MME. The message includes the information of RN as UE, e.g. eNB UE S1 AP ID, MME UE S1 AP ID, the received E-RAB information and the failed E-RAB information.

The message includes the information of UE served by RN. The information of the UE includes (which may be one or more or all):

eNB UE S1 AP ID, and MME UE S1 AP ID (allocated by T-DeNB) of UE in the RN and T-DeNB interface;
  eNB UE S1 AP ID of UE in the T-DeNB and T-MME interface; alternatively, it may also include MME UE S1 AP ID in the T-DeNB and T-MME interface.
  E-RAB information of UE, including E-RAB identifier, downlink TEID and transport layer address of T-DeNB and T-MME interface allocated by T-DeNB for UE served by RN, uplink TEID and transport layer address of the RN and T-DeNB interface allocated by T-DeNB for UE served by RN.

Step 407, T-MME sends a forwarding re-location response message to S-MME. The message includes the information received in step 406.

Step 408, S-MME sends a handover command message to S-DeNB. The message includes the information of RN as UE, e.g. eNB UE S1 AP ID and MME UE S1 AP ID of RN.

The message also includes the information of UE served by RN. The information of the UE includes (which may be one or more or all):

eNB UE S1 AP ID, and MME UE S1 AP ID (allocated by T-DeNB) of UE in the RN and T-DeNB interface;
  E-RAB information of UE, including E-RAB identifier, uplink TEID and transport layer address in the RN and T-DeNB interface allocated by T-eNB for UE served by RN.

Step 409: S-DeNB sends a RRC connection re-configuration message to RN. The message includes the mobile control information of RN as UE. The message also includes the information of UE served by RN. The UE information includes (which may be one or two or all):

eNB UE S1 AP ID, and MME UE S1 AP ID (allocated by T-DeNB) of UE in the RN and T-DeNB interface;

E-RAB information of UE, including E-RAB identifier, uplink TEID and transport layer address of the RN and T-DeNB interface allocated by T-eNB for UE served by RN.

The above information may be transmitted to RN from T-DeNB by the containers in the messages of step 406, step 408 and step 409, or may be transmitted to S-DeNB by the containers in the messages of step 406 and step 408, wherein S-DeNB sends the above information to RN, or may be transmitted to RN directly in the messages of step 406, step 408 and step 409. Or S-DeNB sends the above information to RN in this step by one container, e.g. UE S1 AP container.

RN stores the received above information. UE implicitly establishes UE associated signaling connection of the RN and T-DeNB interface of UE served by RN after receiving the RRC connection re-configuration message. Meanwhile, S1 user plane between RN and T-DeNB is established for UE served by RN through the RRC connection re-configuration process.

Step 410: RN sends a RRC connection re-configuration completion message to T-DeNB.

For this, RN can transmit the uplink data sent by UE under RN to T-DeNB through the above received uplink TEID and transport layer address of RN and T-DeNB interface.

There are two ways to let T-DeNB know the downlink TEID and transport layer address of UE served by RN that are allocated by RN in the RN and T-DeNB interface. One way is including E-RAN identifier of UE and the downlink TEID and transport layer address allocated by RN in the step 401 and step 405. The other way is including the information of UE served by RN in the RRC connection re-configuration completion message in this step. The UE information includes E-RAB information of UE. The E-RAB information includes E-RAB identifier, and the downlink TEID and transport layer address allocated by RN.

Step 411: T-DeNB sends a handover notify message to T-MME.

Step 412: for each UE served by RN, T-MME sends an update bearer request message to S-GW/PDN GW of UE. If S-GW is re-selected for UE in step 403, T-MME sends an update bearer request message to target S-GW/PDN GW. PDN GW may not change when S-GW is re-selected, and the description about the signaling procedure between S-GW and PDN GW is omitted here. The message includes the downlink TEID and transport layer address allocated by T-DeNB for UE. If the target PLMN re-selected for UE is different from source PLMN, and the target PLMN is received from source DeNB in step 401 and step 402, T-MME sends new TAI to S-GW in the modification bearer request message, and S-GW sends it to PDN GW. PDN GW can perform reasonable billing based on this information.

As to S-GW and PDN GW of RN being architecture of single entities (S-GW/PDN GW is non-collocated with RN at the same entity), T-MME sends a modification bearer request message to T-S-GW/PDN GW of RN. The message includes the information of RN as UE. T-S-GW/PDN of RN will send the update bearer response message of step 413 to T-MME.

Step 413: S-GW/PDN GW of UE sends an update bearer response message to T-MME.

Step 414: the information of UE served by RN is updated at the network side, such as, GUTI. How to update is specifically described in the application scene of FIG. 9. In the scheme of the present invention, this step is not a necessary step, i.e. the scheme of this embodiment may not have this step.

Now the whole working procedure of supporting group movement of this embodiment is completed. In the scheme of this embodiment, the source of UE served by RN that is allocated under the RN cell does not need to be re-configured. The handover process does not occur in the access layer from the UE end.

Application Scene Three

In the movement process of RN, it is necessary to switch source DeNB (S-DeNB) to target DeNB (T-DeNB). This embodiment provides the handover procedures of RN and UE, ensuring the continuity of service of UE served by RN and reducing handover signaling.

This application scene differs from the application scene two in: in the application scene two, S-DeNB selects the PLMN serving UE in the target system for UE served by RN, which is sent by S-DeNB to S-MME and is sent by S-MME to T-MME. When PLMN ID or TAI of UE changes, T-MME sends the changed information to S-GW/PDN GW through 412, and then PDN GW can perform reasonable billing for UE. In this embodiment S-MME selects target PLMN for the UE according to HRL of UE, and S-MME sends the PLMN selected for UE to T-MME through the forwarding handover request in step 502. When there is no MME re-location, the corresponding method in this embodiment is that MME selects the PLMN selected for serving UE in the target system for UE served by RN. When PLMN ID or TAI of UE changes, T-MME sends the changed information to S-GW/PDN GW through 512, and then PDN GW can perform reasonable billing for UE, referring to FIG. 5 for details.

Figure 5:
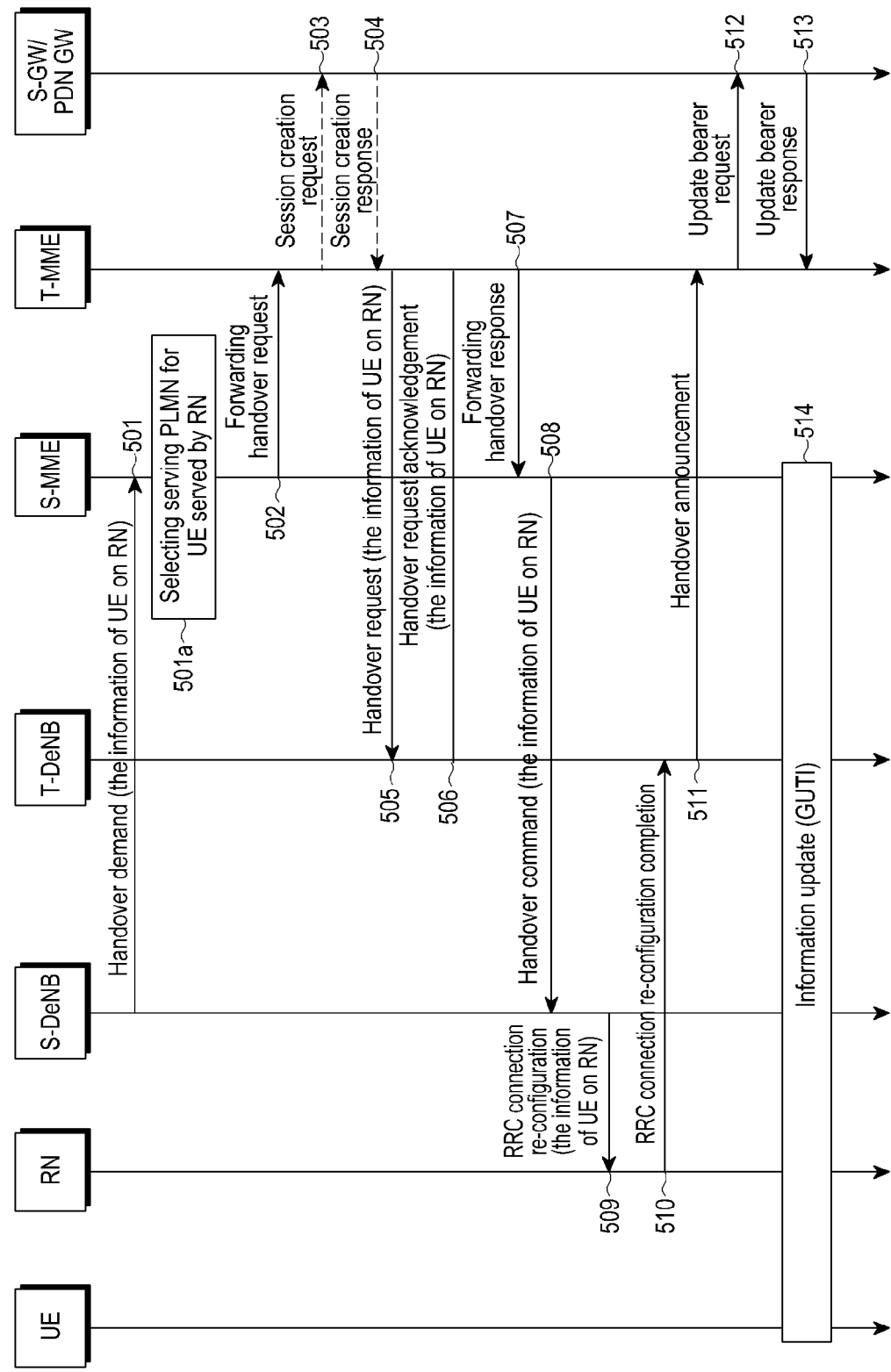
FIG. 5 is a work flow chart of the application scene three of supporting group handover in the present invention.

FIG. 5 is a work flow chart of the application scene three of supporting group handover in the present invention. As illustrated in FIG. 5, the detailed explanation about the steps unrelated to the present invention is omitted here. The procedure includes the following steps:

Step 501: S-DeNB decides to initiate the handover of RN. S-DeNB also switches the UE served by RN to T-DeNB at the same time. S-DeNB sends a handover required message to S-MME (serving RN and MME of UE under RN). The handover required message includes all existing information of RN as UE. The message also includes the information of UE served by RN. The information of UE includes (which may be one or more or all):

- eNB UE S1 AP ID, and MME UE S1 AP ID of UE in S1 interface between RN and S-DeNB;
- eNB UE S1 AP ID, and MME UE S1 AP ID of UE in S1 interface between S-DeNB and S-MME. Alternatively, the UE information also may not include this part of information, since S-MME has already known this part of information;
- E-RAB information of UE, such as E-RAB identifier. It may also include the downlink TEID and transport layer address of UE allocated by RN in the RN and S-DeNB interface.

Step 501*a*: S-MME selects the PLMN of target service for each UE according to Handover Restriction List (HRL) of UE served by RN, and informs T-MME of the PLMN selected for UE served by RN through 502, which may be PLMN identifier, or target PLMN identifier selected for UE that is included in TAI. The target PLMN selected for UE is included in UE information.

Step 502: S-MME selects serving target T-MME for RN and UE under RN. S-MME can select the same target MME for RN and UE under RN. S-MME sends a forwarding re-location request message to T-MME. The message includes the information of UE served by RN received in step 501. The message includes the target PLMN selected for UE, which may be PLMN identifier, or target PLMN identifier selected for UE that is included in the selected TAI. In the case of no MME re-location, the step of this process does not exist.

Steps 503 to 514 are the same as steps 403 to 414, so the detailed technical explanation is omitted.

Now the whole working procedure of supporting the group movement of this embodiment is completed. In this embodiment, the resource of UE served by RN allocated under RN cell does not need to be re-configured. There is no handover process in the access layer from the UE end.

Application Scene Four

In the process of the movement of RN, it is necessary to switch source DeNB (S-DeNB) to target DeNB (T-DeNB). This embodiment provides the handover processes of RN and UE, ensures the continuity of service of UE served by RN, and reduces handover signaling, referring to FIG. 6 for details.

Figure 6:
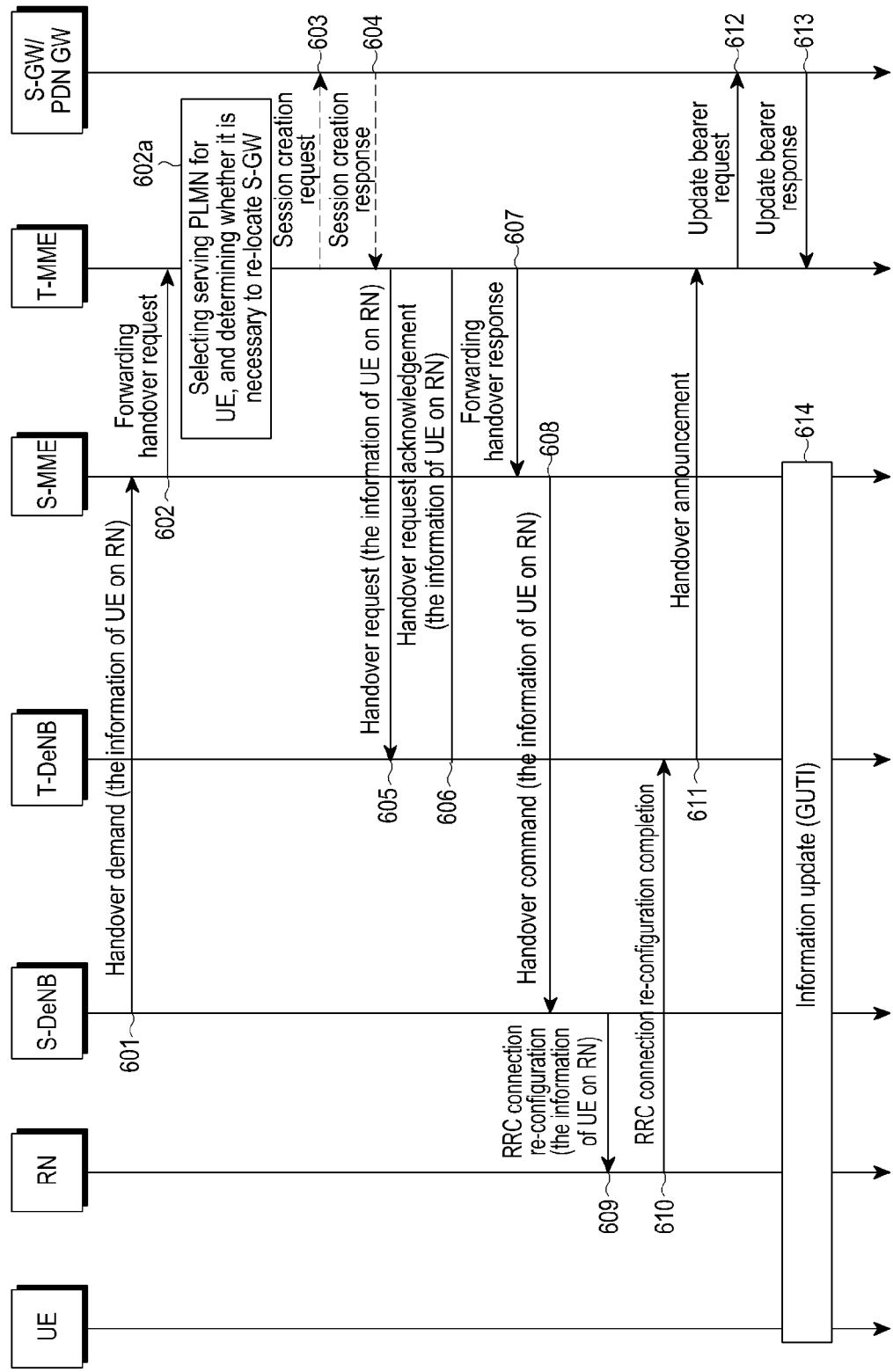
FIG. 6 is a work flow chart of the application scene four of supporting group handover in the present invention.

This embodiment differs from the application scene two in: in the application scene two, S-DeNB selects the PLMN serving UE in the target system for UE served by RN, which is sent by S-DeNB to S-MME and then is sent by S-MME to T-MME. When PLMN ID or TAI of UE changes, T-MME sends the changed information to S-GW/PDN GW through 412, and then PDN GW can perform reasonable billing for UE. In this embodiment, T-MME selects the target PLMN according to HRL of UE. When PLMN ID or TAI of UE changes, T-MME sends the changed information to S-GW/PDN GW through 612, and then PDN GW can perform reasonable billing for UE. Refer to FIG. 6 for details.

FIG. 6 is a work flow chart of the application scene four of supporting group handover in the present invention. As illustrated in FIG. 6, the detailed explanation about the steps unrelated to the present invention is omitted. This procedure includes the following steps:

Step 601 is the same as step 501, and thus is not repeated here.

Step 602, S-MME selects serving target T-MME for RN and UE under RN. S-MME may select the same target MME for RN and UE under RN. S-MME sends a forwarding re-location request message to T-MME. The message includes the information of UE served by RN received in step 601. In the case of no MME re-location, the step of this process does not exist.

Step 602a: T-MME selects the target PLMN serving UE for the UE served by RN, determining whether it is necessary to re-locate S-GW for UE.

Steps 603 to 614 are the same as steps 413 to 414, and thus are not repeated here.

Now the whole working procedure of supporting the group movement of this embodiment is completed. In the method of this embodiment, the resource of UE served by RN allocated under RN cell does not need to be re-configured. There is no handover process in the access layer from the UE end.

Application Scene Five

In the process of the movement of RN, it does not need to switch source DeNB (S-DeNB) to target DeNB (T-DeNB). This embodiment provides the handover processes of RN and UE, ensures the continuity of the service of UE served by RN, and reduces handover signaling. In this embodiment, the handover of RN and the handover of UE served by RN are performed respectively, referring to FIG. 7 for details.

Figure 7A:
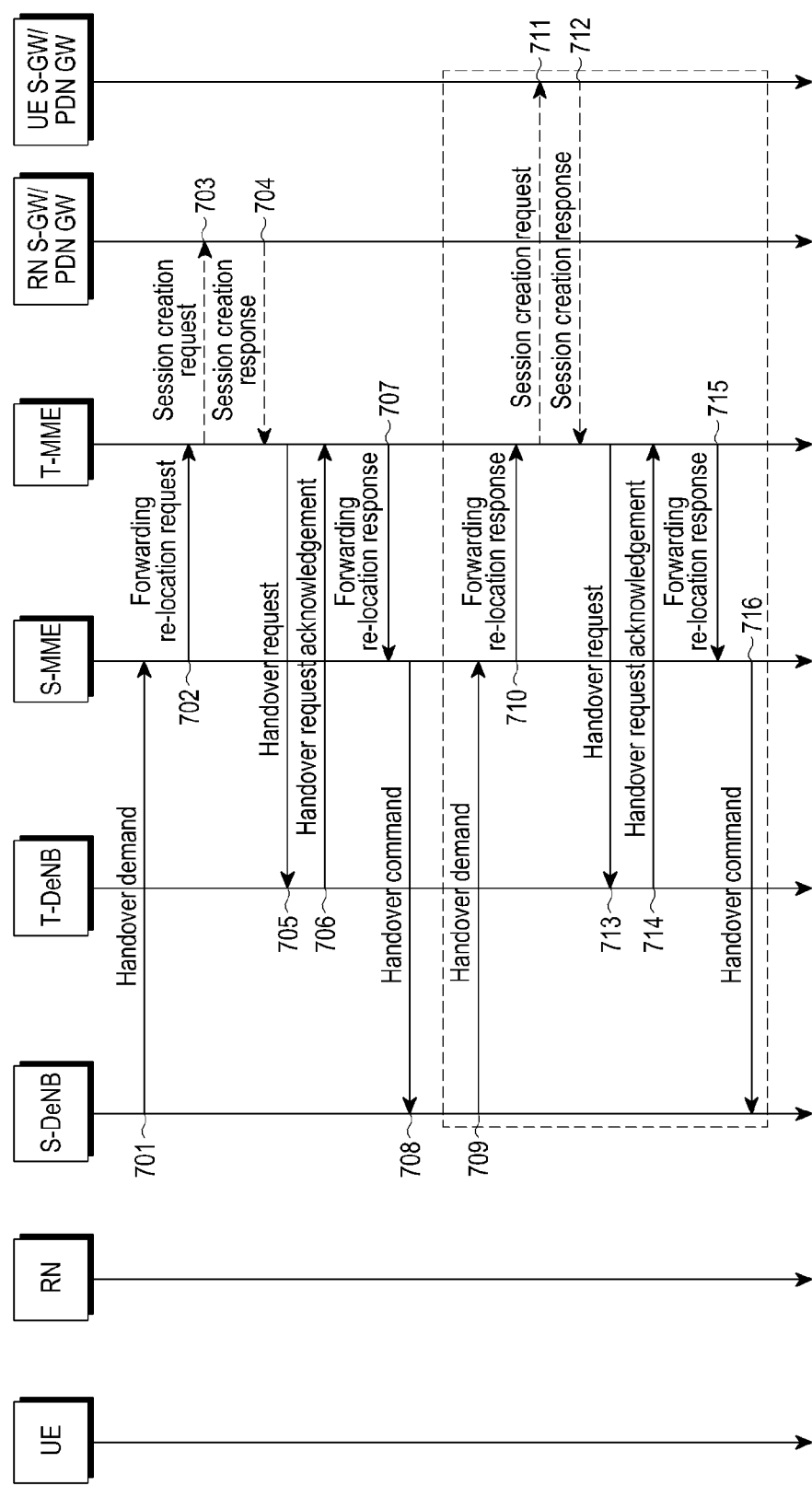
FIG. 7 is a work flow chart of the application scene five of supporting group handover in the present invention.
Figure 7B:
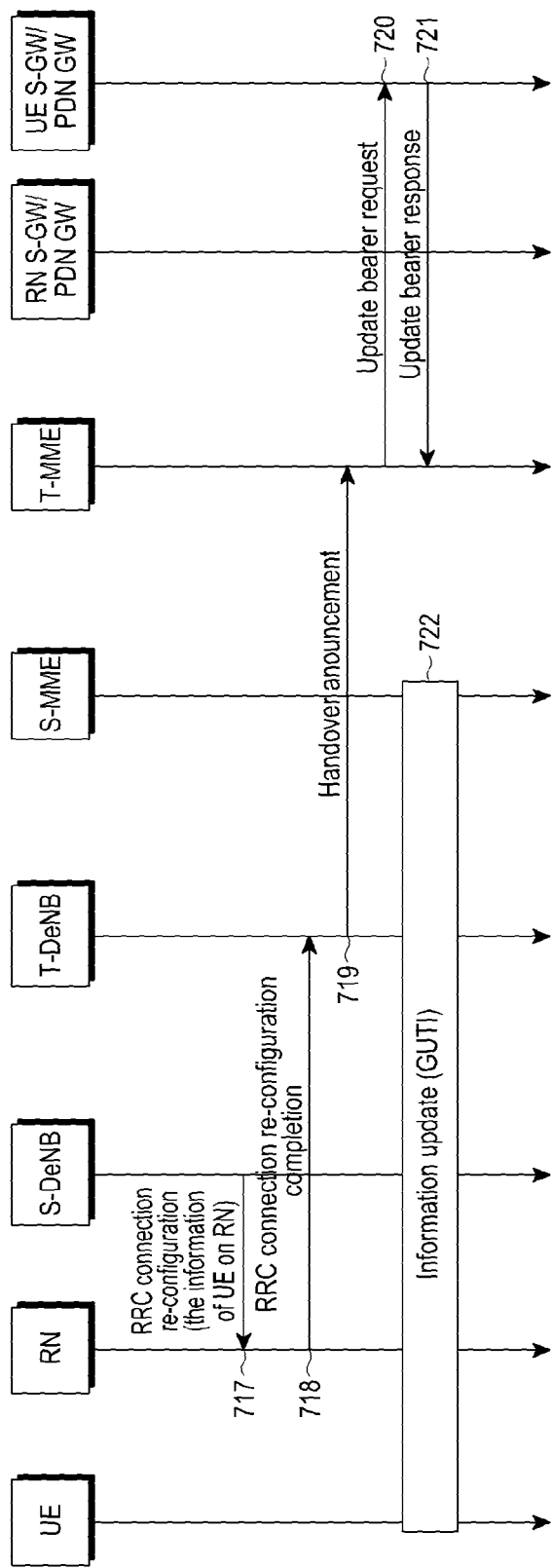

FIG. 7 (having FIG. 7A and FIG. 7B) is a work flow chart of the application scene five of supporting group handover in the present invention. As illustrated in FIG. 7, the procedure comprises the following steps:

Step 701: source DeNB initiates the process of handover of RN. S-DeNB sends a handover required message to S-MME.

Step 702: S-MME sends a forwarding re-location request message to T-MME. In the case of no MME re-location, the process of this step does not exist.

Step 703: T-MME decides whether to re-select S-GW for RN. In the case of reselecting, T-MME sends a session creation request message to target S-GW/PDN GW. The signaling procedure between S-GW and PDN GW is omitted here. In the case of re-selecting S-GW, PDN GW may not change.

Step 704: target S-GW sends a session creation response message to T-MME.

If S-GW and PDN GW and RN are co-located with RN in the architecture of mobile RN, steps 703 and 704 are not necessary.

Step 705, T-MME sends a handover request message to target DeNB.

The source DeNB refers to the DeNB where RN is originally located, and the target DeNB refers to DeNB where RN is required to switch.

Step 706: the target DeNB allocates resource for RN and sends a handover request acknowledgement message to T-MME.

Step 707, T-MME sends a forwarding re-location response message to S-MME.

Step 708: S-MME sends a handover command message to the source DeNB.

The source DeNB initiates the handover process of UE served by RN at the network side. As for each UE served by RN, steps 709 to 716 are repeated. The source DeNB may not need to trigger the handover process of another UE after the execution of step 716 and can trigger UE one by one in turn in step 709. The source DeNB may also not perform the handover process of UE served by RN until step 708, and can start to perform the handover procedure of UE in turn after performing step 701.

Step 709: S-DeNB sends a handover required message to S-MME. The message includes eNB UE S1 AP ID, and MME UE S1 AP ID of UE in S1 interface between RN and S-DeNB. The message may also include the downlink TEID and transport layer address of UE allocated by RN in the RN and S-DeNB interface.

Step 710: S-MME sends a forwarding re-location request message to T-MME. In the case of no MME re-location, the process of this step does not exist.

Step 711: T-MME decides whether to re-select S-GW for UE or not. In the case of re-selecting, T-MME sends a session creation request message to target S-GW/PDN GW. The signaling procedure between S-GW and PDN GW is omitted. In the case of re-selecting S-GW, PDN GW may not change.

Step 712: the target S-GW sends a session creation response message to T-MME.

Step 713: T-MME sends a handover request message to the target DeNB. The message includes the downlink TEID and transport layer address of UE allocated by RN in the RN and S-DeNB interface. The message may also include eNB UE S1 AP ID, and MME UE S1 AP ID of UE in S1 interface between RN and S-DeNB.

Step 714: the target DeNB allocates downlink TEID and transport layer address of T-DeNB and T-MME interface for UE. T-DeNB allocates the uplink TEID and transport layer address of RN and T-DeNB interface for UE. T-DeNB allocates MME UE S1 AP ID of RN and T-DeNB interface for UE, and sends a handover request acknowledgement message to T-MME. The message includes the downlink TEID and transport layer address of T-DeNB and T-MME interface allocated by T-DeNB for UE. The message includes MME UE S1 AP ID of RN and T-DeNB interface allocated by T-DeNB for UE.

Step 715: T-MME sends a forwarding re-location response message to S-MME.

Step 716: S-MME sends a handover command message to source DeNB. The message includes (which may be one or more or all):
  eNB UE S1 AP ID, and MME UE S1 AP ID of UE (allocated by T-DeNB) in the RN and T-DeNB interface;
  E-RAB information of UE, including E-RAB identifier, uplink TEID and transport layer address of RN and T-DeNB interface allocated for UE served by RN.

Step 717 is performed after S-DeNB receives the information of step 708 for handover of RN and the information of step 716 for handover of all UEs served by RN.

Steps 717 to 718 are the same as Steps 409 to 410, and thus are not repeated here.

Step 719: T-DeNB sends a handover notify message to T-MME. T-DeNB may send this message once to instruct the completion of handover. T-DeNB may also send this message in turn for RN and each UE served by RN.

Step 720: as for each UE served by RN, T-MME sends an update bearer request message to S-GW/PDN GW of UE. If S-GW is re-selected for UE in step 711, T-MME sends an update bearer request message to target S-GW/PDN GW. PDN GW may not change when S-GW is re-selected, and the description about the signaling procedure between S-GW and PDN GW is omitted. The message includes the downlink TEID and transport layer address allocated by T-DeNB for UE. If the target PLMN re-selected for UE is different from source PLMN, and the target PLMN is received from source DeNB in step 709 and step 710, T-MME sends new TAI to S-GW in the modification bearer request message, and S-GW is sent to PDN GW. PDN GW may perform reasonable billing for UE according to this information.

As to S-GW and PDN GW of RN being architecture of single entities (S-GW/PDN GW is non-collocated with RN at the same entity), T-MME sends a modification bearer request message to T-S-GW/PDN GW of RN. The message includes the information of RN as UE. T-S-GW/PDN GW of RN will send the update bearer response message of step 712 to T-MME.

Step 721: S-GW/PDN GW of UE sends an update bearer response message to T-MME.

Step 722: the information of UE served by RN is updated at the network side, such as, GUTI. How to specifically update is described in the embodiment of FIG. 9. In the method of the present invention, this step is not a necessary step, i.e. the method of this embodiment may not have this step.

Now the whole working procedure of supporting group movement of this embodiment is completed. In the scheme of this embodiment, the source of UE served by RN allocated under the RN cell does not need to be re-configured. The handover process does not occur in the access layer from the UE end.

Another way for carrying out the application scene five is that other signaling are used to switch all UEs under RN in the steps 709 to 716 except steps 711 to 712, such that the information included in said step 709, step 710, step 713, step 714, step 715 and step 716 is in the same list (with respect to all UEs under RN). The information of each UE is the same as the above specific description. It is necessary to perform steps 711 and 712 once for each UE because S-GW of each UE may be different. If S-GWs of all UEs are the same, steps 711 and 712 may also be performed once for all UEs under RN, such that the message includes the information of all UEs under RN.

Application Scene Six

In the process of movement of RN, it is necessary to switch from source DeNB (S-DeNB) to target DeNB (T-DeNB). This embodiment provides X2 handover procedures of RN and UE, ensures the continuity of service of UE served by RN, and reduces handover signaling, referring to FIG. 8 for details.

FIG. 8 is a work flow chart of the application scene six of supporting group handover in the present invention. As illustrated in FIG. 8, the following procedure is included:

Step 801: S-DeNB decides to initiate handover of RN. S-DeNB also switches UE served by RN to T-DeNB. S-DeNB sends a handover request message to T-DeNB. The handover request message includes all existing information of RN as UE. The information also includes information of UE served by RN. The information of UE includes (which may be one or more or all):
  eNB UE S1 AP ID, and MME UE S1 AP ID of UE in S1 interface between RN and T-DeNB;
  MME UE S1 AP ID of UE in S1 interface between S-DeNB and MME. It may also include the old eNB UE S1 AP ID of UE in S1 interface between S-DeNB and MME;
  E-RAB information of UE, such as E-RAB identifier. It may also include the downlink TEID and transport layer address of UE allocated by RN in the RN and S-DeNB interface.

S-DeNB selects target serving PLMN for each UE according to Handover Restriction List (HRL) of UE served by RN, and the target PLMN selected for UE is included in the UE information, which may be PLMN identifier, including PLMN identifier or target PLMN identifier selected for UE that is included in the selected TAI.

Step 802: T-DeNB allocates wireless resource of the Un interface for RN. T-DeNB allocates the uplink TEID and transport layer address of the RN and T-DeNB interface for UE served by RN. T-DeNB allocates MME UE S1 AP ID of the RN and T-DeNB interface for UE served by RN.

Step 803: T-DeNB sends a handover request acknowledgement message to S-DeNB. The message includes the information of RN as UE, such as the old eNB UE X2 AP ID, the new eNB UE X2 AP ID, the received E-RAB information and the failed E-RAB information.

The message includes the information of UE served by RN. The information of the UE includes (which may be one or more or all):
  eNB UE S1 AP ID, and MME UE S1 AP ID (allocated by T-DeNB) of UE in the RN and T-DeNB interface;
  E-RAB information of UE, including E-RAB identifier, uplink TEID and transport layer address of the RN and T-DeNB interface allocated by T-eNB for UE served by RN.

Steps 803 to 804 are the same as steps 409 to 410, and thus are not repeated here.

Step 805: T-DeNB allocates the downlink eNB UE S1 AP ID for RN, and allocates the downlink TEID and transport layer address for bearer of RN. T-DeNB allocates eNB UE S1 AP ID of T-DeNB and T-MME interface for UE served by RN. T-DeNB allocates the downlink TEID and transport layer address of T-DeNB and T-MME interface for UE served by RN.

T-DeNB sends a path switch request message to MME. The message includes the information of RN as UE, such as eNB UE S1 AP ID, and E-RAB list in the downlink handover. The message also includes the information of UE served by RN, and the information of the UE includes (which may be one or more or all):

eNB UE S1 AP ID of UE between T-DeNB and MME, and MME UE S1 AP ID of UE between S-DeNB and MME;

E-RAB information of UE in the downlink handover, including E-RAB identifier, downlink TEID and transport layer address of T-DeNB and MME interface allocated by T-DeNB;

target PLMN selected for UE, which may be PLMN identifier, or the target PLMN selected for UE that is included in the selected TAI.

Step 806: MME determines whether it is necessary to re-locate S-GW for UE served by RN. As to S-GW and PDN GW of RN being architecture of single entities (S-GW/PDN GW are non-collocated with RN at the same entity), MME determines whether it is necessary to re-locate S-GW of RN. If it is necessary, the message of step 807 is sent to target S-GW of RN, and then step 808 is performed. If not, the message of step 809 is sent to S-GW of RN, and then step 810 is performed.

Step 807: for UE of S-GW required to be re-located, MME sends a session creation request message to S-GW/PDN GW of UE. If PDN GW requests the location information of UE, MME includes the location information of UE, for example, TAI is in said message. TAI includes the selected target PLMN identifier of UE. PDN GW may perform reasonable billing for UE.

Step 808: T-S-GW/PDN GW sends a session creation response message to MME.

Step 809: as for UE of S-GW that does not need re-location, MME sends an update bearer request message to S-GW/PDN GW of UE. If PDN GW requests location information of UE, MME includes the location information of UE, for example, TAI is in said message. TAI includes the selected target PLMN identifier of UE. PDN GW may perform reasonable billing for UE.

Step 810: S-GW/PDN GW of UE sends a modification bearer response message to MME.

Step 811: MME sends a path switch request acknowledgement [message]. The message includes the information of RN as UE. The message also includes the information of UE served by RN. The information of UE includes (which may be one or more or all):

eNB UE S1 AP ID and MME UE S1 AP ID of UE between T-DeNB and MME;

E-RAB information in the uplink handover, such as E-RAB identifier, uplink TEID and transport layer address between T-DeNB and MME;

E-RAB information required to be released.

Step 812: T-DeNB sends UE context release message to S-DeNB. The message includes the information of RN as UE, such as the old eNB UE X2 AP ID and the new eNB UE X2 AP ID. Source DeNB may release the context information of RN. Source DeNB may also release the context information of UE served by RN.

Now the whole working procedure of supporting group movement in this application scene is completed. In the scheme of this embodiment, the resource of UE served by RN allocated under the RN cell does not need re-configuration. The handover process does not occur in the access layer from the UE end.

Figure 9:
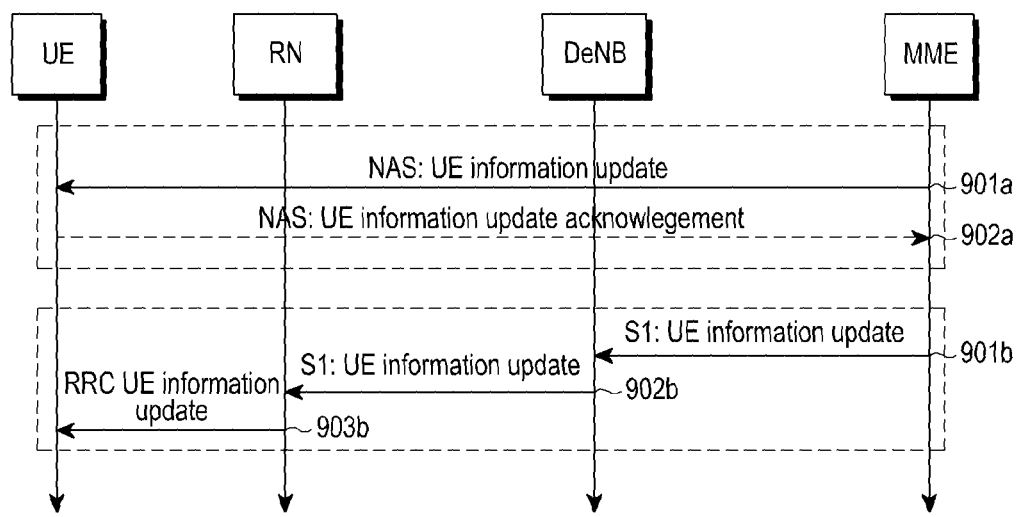
FIG. 9 is a work flow chart of the application scene of notifying change of UE-related information in the present invention.

During the handover of RN, if the information of UE changed, for example, GUTI changed, the application scene informing the change of UE related information is illustrated in FIG. 9.

FIG. 9 is a work flow chart of the application scene of notifying change of UE-related information in the present invention.

There are two ways to carry out:

Method One:

Step 901*a*: MME (it is target MME when MME re-location occurs) sends UE information update to UE through a NAS message, the NAS message includes updated information, such as GUTI. The updated information may also include a TAI list, and may also include an equivalent PLMN list.

The UE information update may be the existing GUITI re-allocation command.

UE stores the above received information.

Step 902*a*: UE sends the received acknowledgement message to MME. The received acknowledgement message, for example, is GUTI re-allocation completion. This step is an optional step.

Method Two:

Step 901*b*: MME (it is target MME if MME re-location occurs) sends UE information update to DeNB through a S1 message. The S1 message may send the information of all UEs under RN to RN. The message includes the information of each UE, such as GUTI of UE, and may also include a TAI list of UE. The message may be sent via the RN associate signaling connection.

Step 902*b*: DeNB sends UE information update to RN through a S1 message. The message may send the information of all UEs under RN to RN. The message includes the information of each UE, such as GUTI of UE, and may also include a TAI list of UE.

Step 903*b*: RN sends the above received information of each UE to corresponding UE through RRC information.

Now the description about informing the change of UE related information is completed.

A person having ordinary skill in the art may appreciate that all or part of steps involved in the above method of the embodiments may instruct the relevant hardware to complete through program. The program may be stored in a computer readable storage medium. The program includes one of the steps of the method embodiments or combination thereof when implementing.

In addition, the respective functional units in the respective embodiments of the present invention may be integrated in one processing module, and may also singly physically exist, and may also be integrated in one module by two or more units. The above integrated module may be carried out in the form of hardware, and in the form of software functional module. When the integrated module is carried out in the form of software functional module and is sold or used as an independent product, it may also be stored in a computer readable storage medium.

The above-mentioned storage medium may be read-only storage, disk or disc.

The foregoing is part of embodiments of the present invention. It should be pointed out that a person having ordinary skill in the art may also make several improvements and modifications in the premise of not losing the principle of the present invention, and these improvements and modifications should also be regarded as the protection scopes of the present invention.

The invention claimed is:

1. A method of supporting group handover, the method comprising:
   receiving, by a serving base station from a relay node (RN), an uplink message for a network attachment or a location update of an user equipment (UE) served by the RN;
   selecting, by the serving base station, a mobility management entity (MME) for the UE served by the RN as the RN;
   determining, by the serving base station, a handover for the RN and the UE;
   switching, by the serving base station, the RN serving the UE in communication with a network from the serving base station to a target base station; and
   switching, by the serving base station, the UE served by the RN to the target base station.

2. The method according to claim 1, wherein one of the serving base station or the target base station obtains information of the UE based on a type of a message received from the UE when the UE accesses the network via the RN, and wherein the one of the serving base station or the target base station obtains the information of the UE based on an instruction of the RN when the UE accesses the network via the RN.

3. The method according to claim 1, wherein switching the RN to the target base station and switching the UE served by the RN to the target base station are performed simultaneously.

4. The method according to claim 3, wherein switching the RN to the target base station and switching the UE served by the RN to the target base station comprises:
   sending, by the serving base station, a UE identifier of the UE served by the RN in an interface between the RN and the serving base station, to the target base station;
   allocating, by the target base station, user plane information of an interface between the RN and the target base station and a UE identifier (ID) of the interface between the RN and the target base station for the UE served by the RN;
   notifying, by the target base station, the serving base station of a resource allocated by the target base station for the UE;
   sending, by the serving base station, an RRC connection re-configuration message to the RN, the RRC connection re-configuration message comprising resource information allocated by the target base station for the UE served by the RN;
   sending, by the RN, an RRC connection re-configuration completion message to the target base station;
   sending, by the target base station, a handover notify message to the MME; and
   updating, by the MME, bearers of the RN and the UE served by the RN.

5. The method according to claim 4, wherein the UE identifier of the UE in the interface between the RN and the serving base station is one of a UE ID that identifies the UE over an S1 interface within the serving base station or a UE ID that identifies the UE over the S1 interface within the MME.

6. The method according to claim 4, wherein the user plane information includes an evolved universal terrestrial access network (E-UTRAN) radio access bearer (E-RAB) identifier, and a downlink tunnel endpoint identifier (TEID) and transport layer address of the UE served by the RN that are allocated by the RN in the interface between the RN and the serving base station.

7. The method according to claim 4, wherein the resource information includes one of the user plane information allocated by the target base station for the at least one UE served by the RN, or a UE ID that identifies the UE over an S1 interface between the RN and the target base station within the MME.

8. The method according to claim 3, wherein switching the RN to the target base station and switching the UE served by the RN to the target base station comprises:
   sending, by the serving base station, a handover request message to the target base station, the handover request message including a UE identifier of the UE served by the RN in an interface between the RN and the serving base station;
   allocating, by the target base station, user plane information of an interface between the RN and the target base station and an UE identifier (ID) of the interface between the RN and the target base station for the UE served by the RN;
   sending, by the target base station, a handover request acknowledgement message to the serving base station, the message including a resource allocated by the target base station for the UE;
   sending, by the serving base station, an RRC connection re-configuration message to the RN, the RRC connection re-configuration message including resource information allocated by the target base station for the UE served by the RN;
   sending, by the RN, an RRC connection re-configuration completion message to the target base station;
   sending, by the target base station, a path switch request message to the MME, the path switch request message including information of the UE served by the RN;
   updating, by the MME, bearers of the RN and the UE on the RN;
   sending, by the MME, a path switch request acknowledgement message to the target base station, the path switch request acknowledgement message including the information of the UE on the RN; and
   sending, by the target base station, a UE context release message to the serving base station.

9. The method according to claim 8, wherein the MME is configured to update the information of the UE by sending messages to the UE by the serving base station or the target base station and the RN.

10. The method according to claim 9, wherein the information updated for the UE includes one of a Global UE Temporary Identifier (GUTI), or a Track Area Identifier (TAI) list.

11. The method according to claim 8, wherein the information of the UE served by the RN that is included in the path switch request message comprises:
   a UE ID that identifies the UE over an S1 interface between the target base station and the MME within the target base station and a UE ID that identifies the UE over an S1 interface between the serving base station and the MME within the MME;
   evolved universal terrestrial access network (E-UTRAN) radio access bearer (E-RAB) information of the at least one UE in downlink handover, including an E-RAB identifier, downlink tunnel endpoint identifier (TEID) and transport layer address of the interface between the target base station and the MME, allocated by the target base station; and target public land mobile network (PLMN) selected for the UE, including a PLMN identifier or a target PLMN identifier to be selected for the UE that is included in a selected Track Area Identifier (TAI).

12. The method according to claim 8, wherein the information of the UE served by the RN that is included in the path switch request acknowledgement message includes:
   one of a UE ID that identifies the UE over an S1 interface between the target base station and the MME within the target base station or a UE ID that identifies the UE over an S1 interface between the target base station and the MME within the MME;
   evolved universal terrestrial access network (E-UTRAN) radio access bearer (E-RAB) information of an uplink handover, an E-RAB identifier, and an uplink tunnel endpoint identifier (TEID) and transport layer address of the interface between the target base station and the MME; and
   an indication of an E-RAB required to be released.

13. The method according to claim 3, wherein switching the RN to the target base station and switching the UE served by the RN to the target base station comprises:
   sending, by the serving base station, a handover required message to the MME, and initiating a handover preparation process for switching RN;
   sending, by the S-DeNB, a handover required message to the MME, and initiating a handover preparation process for switching the UE served by the RN, the handover required message including control plane and user plane information of the UE served by the RN in an interface between the RN and the serving base station, the control plane information including one of a UE identifier (ID) that identifies the UE over an S1 interface within the service base station or a UE ID that identifies the UE over an S1 interface within the MME, the user plane information including at least one of downlink tunnel endpoint identifier (TEID) and transport layer address or uplink TEID and transport layer address of UE in the interface between the RN and the serving base station;
   when handover preparation for switching the RN and switching the UE under the RN is completed, sending, by the serving base station, an RRC connection re-configuration message to the RN, the RRC connection re-configuration message comprising the information of the UE served by the RN;
   sending, by the RN, an RRC connection re-configuration completion message to the target base station;
   sending, by the target base station, a handover notify message to the MME; and
   updating, by the MME, bearers of the RN and the UE on the RN.

14. A base station supporting group handover, comprising:
   a receiving module configured to receive, from a relay node (RN), an uplink message for a network attachment or a location update of a UE served by the RN;
   a processor configured to select a mobility management entity (MME) for the UE served by the RN as the RN, and determine a handover for the RN and the UE; and
   a transmitting module configured to send information to a target base station to achieve handover of the RN to the target base station and handover of the UE served by the RN to the target base station.

15. The base station according to claim 14, wherein one of the serving base station or the target base station obtains information of the UE based on a type of a message received from the UE when the UE accesses the network via the RN, and wherein the one of the serving base station or the target base station obtains the information of the UE based on an instruction of the RN when the UE accesses the network via the RN.

16. The base station according to claim 14, wherein the handover of the RN to the target base station and the handover of the UE served by the RN to the target base station are performed simultaneously.

17. The base station according to claim 16, wherein the handover of the RN to the target base station and the handover of the UE served by the RN to the target base station are performed by:
   sending, by the serving base station, a UE identifier of the UE served by the RN in an interface between the RN and the serving base station, to the target base station;
   allocating, by the target base station, user plane information of an interface between the RN and the target base station and an UE identifier of the interface between the RN and the target base station for the UE served by the RN;
   notifying, by the target base station, the serving base station of a resource allocated by the target base station for the UE;
   sending, by the serving base station, an RRC connection re-configuration message to the RN, the RRC connection re-configuration message comprising resource information allocated by the target base station for the UE served by the RN;
   sending, by the RN, an RRC connection re-configuration completion message to the target base station;
   sending, by the target base station, a handover notify message to the MME; and
   updating, by the MME, bearers of the RN and the UE served by the RN.

18. The base station according to claim 17, wherein the UE identifier of the UE in the interface between the RN and the serving base station is one of an UE ID that identifies the UE over an S1 interface within the serving base station or an UE ID that identifies the UE over the S1 interface within the MME.

19. The base station according to claim 17, wherein the user plane information includes an evolved universal terrestrial access network (E-UTRAN) radio access bearer (E-RAB) identifier, and a downlink tunnel endpoint identifier (TEID) and transport layer address of the UE served by the RN that are allocated by the RN in the interface between the RN and the serving base station.

20. The base station according to claim 17, wherein the resource information includes one of the user plane information allocated by the target base station for the at least one UE served by the RN, or an UE ID that identifies the UE over an S1 interface between the RN and the target base station within the MME.

21. The base station according to claim 16, wherein the handover of the RN to the target base station and the handover of the UE served by the RN to the target base station are performed by:
   sending, by the serving base station, a handover request message to the target base station, the handover request message including a UE identifier of the UE served by the RN in an interface between the RN and the serving base station;
   allocating, by the target base station, user plane information of an interface between the RN and the target base station and an UE identifier of the interface between the RN and the target base station for the UE served by the RN;

sending, by the target base station, a handover request acknowledgement message to the serving base station, the message including a resource allocated by the target base station for the UE;

sending, by the serving base station, an RRC connection re-configuration message to the RN, the RRC connection re-configuration message including resource information allocated by the target base station for the UE served by the RN;

sending, by the RN, an RRC connection re-configuration completion message to the target base station;

sending, by the target base station, a path switch request message to the MME, the path switch request message including information of the UE served by the RN;

updating, by the MME, bearers of the RN and the UE on the RN;

sending, by the MME, a path switch request acknowledgement message to the target base station, the path switch request acknowledgement message including the information of the UE on the RN; and sending, by the target base station, a UE context release message to the serving base station.

22. The base station according to claim 21, wherein the MME is configured to update the information of the UE by sending messages to the UE by the serving or target base station and the RN.

23. The base station according to claim 22, wherein the information updated for the UE includes one of a Global UE Temporary Identifier (GUTI), or a Track Area Identifier (TM) list.

24. The base station according to claim 21, wherein the information of the UE served by the RN that is included in the path switch request message comprises:
    an UE ID that identifies the UE over an S1 interface between the target base station and the MME within the target base station, and an UE ID that identifies the UE over an S1 interface between the serving base station and the MME within the MME;
    evolved universal terrestrial access network (E-UTRAN) radio access bearer (E-RAB) information of the at least one UE in downlink handover, including an E-RAB identifier, downlink tunnel endpoint identifier (TEID) and transport layer address of the interface between the target base station and the MME, allocated by the target base station; and
    target public land mobile network (PLMN) selected for the UE, including a PLMN identifier or a target PLMN identifier to be selected for the UE that is included in a selected Track Area Identifier (TAI).

25. The base station according to claim 21, wherein the information of the UE served by the RN that is included in the path switch request acknowledgement message includes:
    one of an UE ID that identifies the UE over an S1 interface between the target base station and the MME within the target base station or an UE ID that identifies the UE over an S1 interface between the target base station and the MME within the MME;
    evolved universal terrestrial access network (E-UTRAN) radio access bearer (E-RAB) information of an uplink handover, an E-RAB identifier, and an uplink tunnel endpoint identifier (TEID) and transport layer address of the interface between the target base station and the MME; and
    an indication of an E-RAB required to be released.

26. The base station according to claim 16, wherein the handover of the RN to the target base station and the handover of the UE served by the RN to the target base station are performed by:
    sending, by the serving base station, a handover required message to the MME, and initiating a handover preparation process for switching the RN;
    sending, by the serving base station, a handover required message to the MME, and initiating a handover preparation process for switching the UE served by the RN, the handover required message including control plane and user plane information of the UE served by the RN in an interface between the RN and the serving base station, the control plane information including one of an UE ID that identifies the UE over an S1 interface within the serving base station or an UE ID that identifies the UE over an S1 interface within the MME, the user plane information including at least one of downlink tunnel endpoint identifier (TEID) and transport layer address or uplink TEID and transport layer address of UE in the interface between the RN and the serving base station;
    when handover preparation for switching the RN and switching the UE under the RN is completed, sending, by the serving base station, an RRC connection re-configuration message to the RN, the RRC connection re-configuration message comprising the information of the UE served by the RN;
    sending, by the RN, an RRC connection re-configuration completion message to the target base station;
    sending, by the target base station, a handover notify message to the MME; and
    updating, by the MME, bearers of the RN and the UE on the RN.

* * * * *